(12) United States Patent
Balakrishnan et al.

(10) Patent No.: US 10,534,618 B2
(45) Date of Patent: *Jan. 14, 2020

(54) AUTO BOOTLOADER RECOVERY IN BMC (71) Applicant: American Megatrends International, LLC, Norcross, GA (US)

(72) Inventors: Venkatesan Balakrishnan, Chennai (IN); Anand Krishnan Vadivelu, Trichy (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,409

(22) Filed: Sep. 27, 2016

(65) Prior Publication Data
US 2018/0088962 A1    Mar. 29, 2018

(51) Int. Cl.
*G06F 9/4401* (2018.01)
*G06F 11/14* (2006.01)
*G06F 11/30* (2006.01)

(52) U.S. Cl.
CPC ........ *G06F 9/4408* (2013.01); *G06F 11/1417* (2013.01); *G06F 11/3058* (2013.01); *G06F 2201/86* (2013.01)

(58) Field of Classification Search
None
See application file for complete search history.

(56) References Cited

U.S. PATENT DOCUMENTS

| 6,651,188 | B2* | 11/2003 | Harding | G06F 11/1417 714/38.13 |
| 6,715,067 | B1* | 3/2004 | Rhoads | G06F 3/0607 711/206 |
| 6,741,978 | B1* | 5/2004 | Rhoads | G06F 9/441 |
| 7,127,596 | B2* | 10/2006 | Rich | G06F 9/4406 713/1 |
| 8,407,460 | B1* | 3/2013 | Streuter | G06F 9/4408 713/1 |
| 9,542,195 | B1* | 1/2017 | Astarabadi | G06F 9/4411 |
| 2006/0123223 | A1* | 6/2006 | Mayfield | G06F 9/4403 713/2 |
| 2007/0169088 | A1* | 7/2007 | Lambert | G06F 11/0709 717/168 |

(Continued)

*Primary Examiner* — Jaweed A Abbaszadeh
*Assistant Examiner* — Cheri L Harrington
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a management device. The management device executes a first bootloader from a first image stored at a primary storage device of the management device. The management device re-executes the first bootloader from the first image when the executing is not successful and a number of re-execution is less than a predetermined number. The management device locates a second image from a secondary storage device when the execution of the first bootloader is not successful and the number of re-execution is greater than or equal to the predetermined number. The management device executes a second bootloader from the second image subsequent to the locating the second image.

19 Claims, 5 Drawing Sheets

(56) References Cited

U.S. PATENT DOCUMENTS

| | | | |
|---|---|---|---|
| 2007/0174704 A1* | 7/2007 | Shih | G06F 11/3664 |
| | | | 714/36 |
| 2012/0110378 A1* | 5/2012 | Fan | G06F 11/1658 |
| | | | 714/15 |
| 2012/0110379 A1* | 5/2012 | Shao | G06F 11/1417 |
| | | | 714/15 |
| 2013/0036300 A1* | 2/2013 | Baik | G06F 9/4401 |
| | | | 713/2 |
| 2013/0268746 A1* | 10/2013 | Hsu | G06F 21/572 |
| | | | 713/2 |
| 2014/0129820 A1* | 5/2014 | Lim | G06F 8/654 |
| | | | 713/2 |
| 2014/0365823 A1* | 12/2014 | Michihata | G06F 9/4401 |
| | | | 714/16 |
| 2015/0154092 A1* | 6/2015 | Chen | G06F 9/4401 |
| | | | 713/2 |
| 2016/0328300 A1* | 11/2016 | Rahardjo | G06F 11/1417 |
| 2017/0046229 A1* | 2/2017 | Hsu | G06F 11/1417 |
| 2017/0109235 A1* | 4/2017 | Hung | G06F 11/1417 |
| 2017/0177375 A1* | 6/2017 | Bibb, Jr. | G06F 9/4403 |
| 2017/0249156 A1* | 8/2017 | Frey | G06F 11/0757 |
| 2017/0357515 A1* | 12/2017 | Bower, III | G06F 9/4405 |
| 2018/0052798 A1* | 2/2018 | Balakrishnan | G06F 13/4282 |

\* cited by examiner

AUTO BOOTLOADER RECOVERY IN BMC

BACKGROUND

Field

The present disclosure relates generally to computer management devices, and more particularly, to techniques of recovering bootloader of a baseboard management controller (BMC) when images stored on a storage device (e.g., a serial peripheral interface (SPI) storage device) of the BMC are corrupted.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, PROM, EPROM, EEPROM, etc. Accordingly, there is a need to provide an improved firmware recovery mechanism.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a management device. The management device initiates a first booting process of a program from a first image stored at a primary storage device of the management device. The management device re-initiates the first booting process from the first image when the first booting process is not successful and a number of re-initiation is less than a predetermined number. The management device locates a second image of the program from a secondary storage device when the first booting process is not successful and the number of re-initiation is greater than or equal to the predetermined number. The management device initiates a second booting process of the program from the second image subsequent to the locating the second image. —In an aspect of the disclosure, a method, a computer-readable medium, and an apparatus are provided. The apparatus may be a management device. The management device executes a first bootloader from a first image stored at a primary storage device of the management device. The management device re-executes the first bootloader from the first image when the executing is not successful and a number of re-execution is less than a predetermined number. The management device locates a second image from a secondary storage device when the execution of the first bootloader is not successful and the number of re-execution is greater than or equal to the predetermined number. The management device executes a second bootloader from the second image subsequent to the locating the second image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In enterprise class servers, management firmware of a BMC is often updated when new features are introduced. In certain configurations, firmware images may be stored in a SPI chip of the BMC. In such cases, a SPI chip corruption may occur due to external factors such as a network connection failure, etc. A critical entity of BMC firmware is the bootloader (e.g., U-BOOT), which performs CPU level initializations and kick-starts a BMC operating system (OS) (e.g., LINUX) boot. When the memory region of the SPI chip storing the U-BOOT is corrupted, it becomes more painful to recover the firmware and may require hardware intervention.

Figure 1:
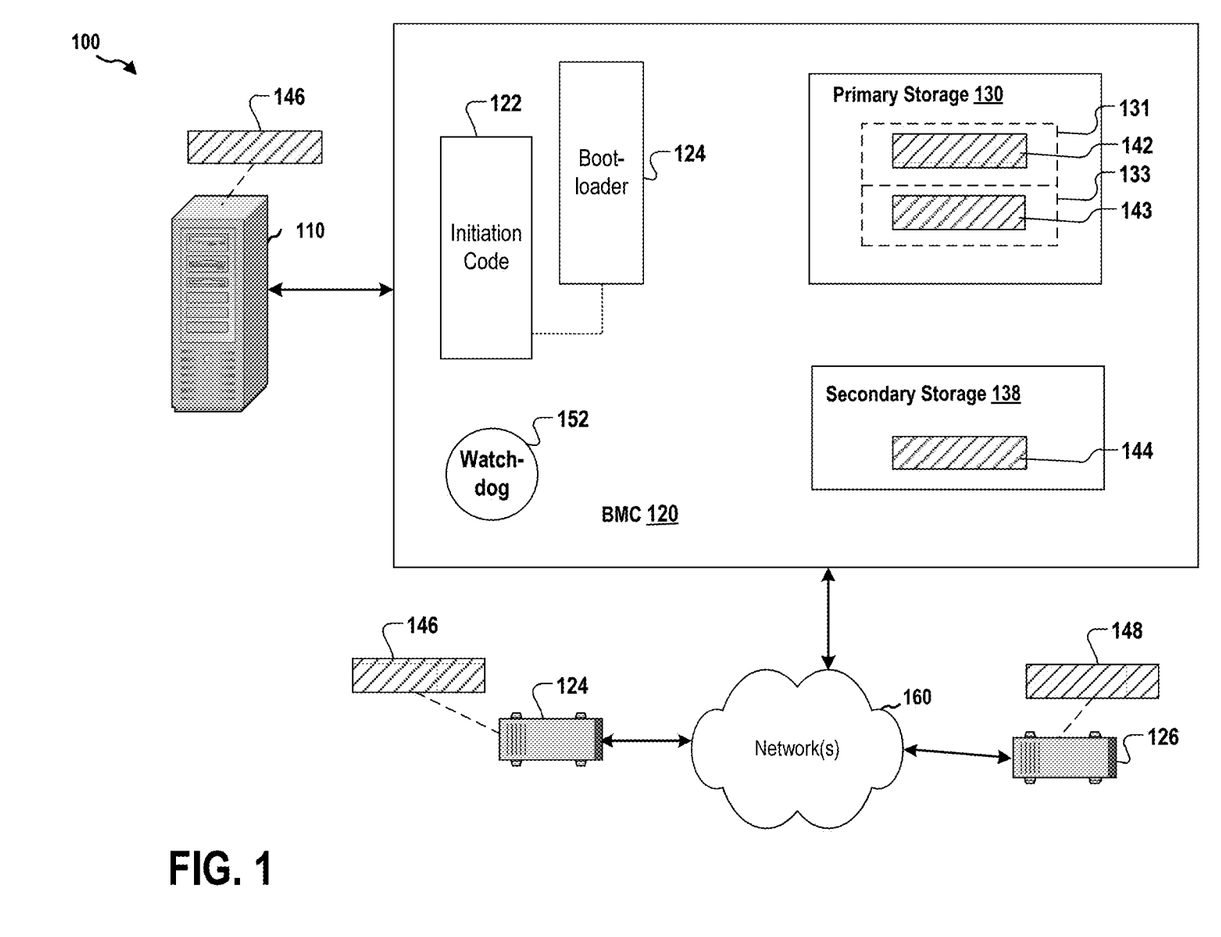
FIG. 1 is a diagram illustrating a BMC.

FIG. 1 is a diagram 100 illustrating a BMC 120. The BMC 120 has initiation code 122, a primary storage device 130, second storage device 138, and a watchdog 152. The BMC 120 may be in communication with a network device 124 and a network device 126 via a network 160. The BMC 120 may manage a host computer 110.

Further, the primary storage device 130 may have a section 131 storing a main image 142 of a bootloader 124. The primary storage device 130 may also have a section 133 storing an OS image 143. In particular, the primary storage device 130 may be a SPI storage device dedicated for storing the main image 142 and the OS image 143. The initiation code 122 may be configured to load the main image 142 from the primary storage device 130 and executes the bootloader 124 contained in the main image 142. The bootloader 124 may perform processor level initialization and may kick start an OS of the BMC. For example, the bootloader 124 may be U-BOOT. The bootloader 124 may further load the OS image 143 from the primary storage device 130 and boot the BMC OS contained in the OS image 143.

The second storage device 138 stores a backup image 144 of the bootloader 124. The second storage device 138 may be part of a separate BMC sub-system that provides an auto bootloader recovery feature. In certain configurations, the second storage device 138 may be a non-volatile programmable ROM (PROM). In one example, the second storage device 138 is a PROM no more than 512 KB within the processor (e.g., the processor 404 as described infra referring to FIG. 4) of the BMC 120, capable of holding a U-BOOT image. The processor of the BMC 120 may be implemented as a system on chip (SoC). The second storage device 138 may be a storage device dedicated only to store the backup image 144. In certain configurations, the second storage device 138 may be a SPI storage device separate from the primary storage device 130.

From time to time, the main image 142 of the bootloader and the OS image 143 stored on the primary storage device 130 may need to be updated (flashed). That is, the main image 142 and the OS image 143 may need to be replaced by other versions (e.g., newer versions) of the images. For example, the bootloader 124 or the BMC OS may receive replacement images 146 from the host computer 110 or from the network device 124 through the network 160. Upon receiving the replacement images 146, the bootloader 124 or the BMC OS replaces the images stored in the primary storage device 130 with the replacement images 146. As such, the replacement images 146 now, stored at the primary storage device 130, serve as the main image 142 and the OS image 143.

Subsequently, the initiation code 122 reads the current main image 142 stored on the primary storage device 130 and boots the bootloader 124 contained in the current main image 142.

After the initiation code 122 starts executing the bootloader 124 contained the main image 142 (or the replacement images 146 serves as the main image 142) on the primary storage device 130, the watchdog 152 is initiated (e.g., by the initiation code 122). In particular, the watchdog 152 may be a hardware component. The watchdog 152 may be configured to trigger a reset (e.g., a restart) of the BMC 120 after a configurable time period (e.g., 8, 10, or 12 seconds). Further, the initiation code 122 may increment a boot-failure counter that is used to record the number of times the booting process has been initiated.

When the bootloader 124 is successfully executed, the bootloader 124 may be configured to disable or interrupt the watchdog 152 before the configurable time period has passed. Consequently, the watchdog 152 is not able to reset the BMC 120. Further, the bootloader 124 may reset the boot-failure counter to a default value (e.g., 0). The booted bootloader 124 continues to run. For example, the bootloader 124 may load and boot the BMC OS from the OS image 143.

On the other hand, the execution of the bootloader 124 from the main image 142 may not be successful. For example, the execution may be hung or may encounter a fatal error. Therefore, the execution process does not proceed to the point at which the bootloader 124 may disable or interrupt the watchdog 152. As the watchdog 152 continues to run, the watchdog 152 resets the BMC 120 at the end of the configurable time period described supra.

After a reset, the BMC 120 starts the initiation code 122 again. The initiation code 122 initially checks the boot-failure counter to determine if the boot-failure counter reaches a pre-configured number (e.g., 5). If not, the initiation code 122 reads the main image 142 from the primary storage device 130 and executes the bootloader 124 contained in the main image 142 again as described supra. If the boot-failure counter has reached the pre-configured number, the initiation code 122 then locates the backup image 144 stored on the second storage device 138.

In certain configurations, the initiation code 122 may copy the backup image 144 from the second storage device 138 to the primary storage device 130. That is, the initiation code 122 may replace the main image 142 with the backup image 144. The initiation code 122 may then read the backup image 144 from the primary storage device 130 and executes the bootloader 124 contained in the backup image 144.

In certain configurations, the initiation code 122 may be configured to read the backup image 144 directly from the second storage device 138. The initiation code 122 then initiates the execution of the bootloader 124 contained in the backup image 144.

As such, the BMC 120 is in execution of the bootloader 124 contained in the backup image 144. Such a bootloader 124 in a working condition may recover, or may allow a user to recover, the main image 142 and the OS image 143 on the primary storage device 130 from recovery backup images 148 stored on the network device 126 or the host computer 110. For example, the network device 126 may be a trivial file transfer protocol (TFTP) server. The bootloader 124 contained in the backup image 144 may be configured with the network address of the TFTP server and the file name of the recovery backup images 148. Accordingly, the bootloader 124 may try to download the recovery backup images 148 from the TFTP server. The initiation code 122 may replace the main image 142 and the OS image 143 on the primary storage device 130 with the recovery backup images 148. In another example, the bootloader 124 contained in the backup image 144 may be configured to communicate with the host computer 110 through a system interface (e.g., an KCS interface) to obtain the recovery backup images 148. After obtaining the recovery backup images 148 from the network device 126 or the host computer 110, the bootloader 124 may replace the images on the primary storage device 130 with the recovery backup images 148. Subsequently, the bootloader 124 may reset the BMC 120. After the reset, the initiation code 122 may execute the bootloader contained in the recovery backup images 148.

Figure 2:
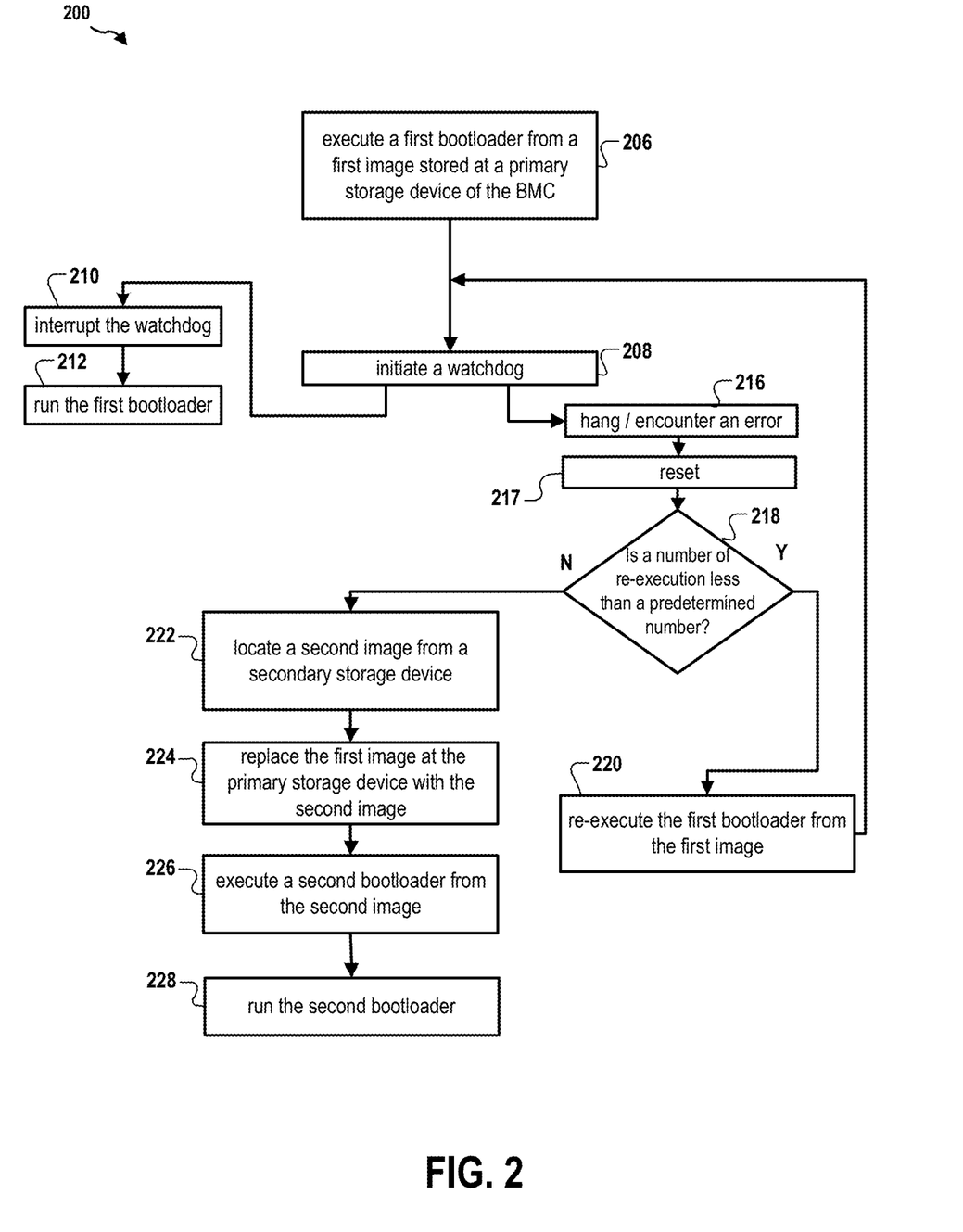
FIG. 2 is a flow chart of a method (process) for recovering a disk image of a bootloader.

FIG. 2 is a flow chart 200 of a method (process) for recovering a disk image of a bootloader. The method may be performed by a management device (e.g., the BMC 120 and the apparatus 302/302').

At operation 206, the management device executes a first bootloader from a first image (e.g., the bootloader contained in the main image 142) stored at a primary storage device (e.g., the primary storage device 130) of the management device. At operation 208, the management device initiates a watchdog (e.g., the watchdog 152). The watchdog is configured to wait, unless interrupted, a predetermined time period subsequent to the execution of the first bootloader and then trigger a reset of the management device.

When the execution of the first bootloader is successful, the management device enters operation 210, at which the management device interrupts the watchdog. At operation 212, the management device continues to runs the first bootloader.

On the other hand, the execution of the first bootloader may not be successful. The execution of the first bootloader is not successful when the watchdog is not interrupted during the predetermined time period. For example, at operation 216, the management device may hang or encounter an error. As such, at operation 217, the watchdog resets the management device. After reset, the management device, at operation 218, determines whether the number of re-execution is less than the predetermined number. When the number of re-initiation is less than the predetermined number, the management device, at operation 220, re-executes the first bootloader from the first image. Subsequently, the management device enters operation 208 again.

When the number of re-initiation is not less than the predetermined number, the management device, at operation 222, locates a second image (e.g., the backup image 144) from a secondary storage device (e.g., the second storage device 138). At operation 224, the management device optionally replaces the first image at the primary storage device with the second image. At operation 226, the management device initiates the execution of a second bootloader from the second image. At operation 228, the management device continues to run the second bootloader. In certain configurations, the secondary storage device 344 is dedicated for storing the second image. In certain configurations, the secondary storage device 344 is a PROM. In certain configurations, the secondary storage device 344 is a SPI storage device. In certain configurations, the primary storage device 342 is a SPI storage device.

Figure 3:
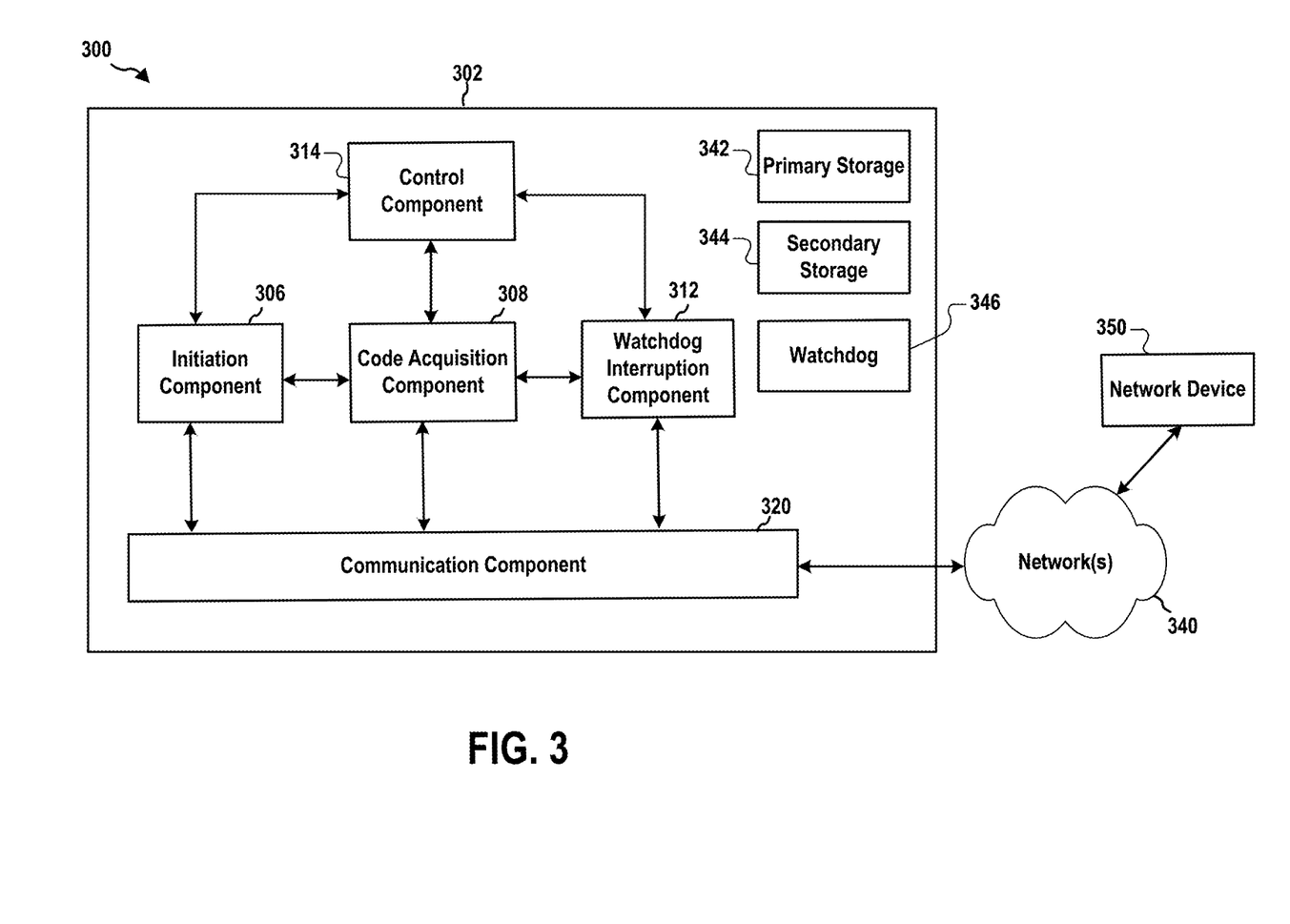
FIG. 3 is a conceptual data flow diagram illustrating the data flow between different means/components in an exemplary apparatus.

FIG. 3 is a conceptual data flow diagram 300 illustrating the data flow between different components/means in an exemplary apparatus 302. The apparatus 302 may be a management device (e.g., the BMC 120). The apparatus 302 includes, among other components, a initiation component 306, a code acquisition component 308, a watchdog interruption component 312, a control component 314, and a communication component 320. The apparatus 302 also includes a primary storage device 342, a secondary storage device 344, and a watchdog 346. The apparatus 302 may be in communication with, through one or more networks 340, a network device 350.

The initiation component 306 executes a first bootloader from a first image stored at the primary storage device 342 of the management device. The control component 314 initiates the watchdog 346 subsequent to the execution of the first bootloader. The watchdog 346 is configured to wait, unless interrupted, a predetermined time period subsequent to the execution of the first bootloader and then trigger a reset of the management device.

When the execution of the first bootloader is successful, the watchdog interruption component 312 interrupts the watchdog 346. The management device continues to runs the first bootloader.

On the other hand, the execution of the first bootloader may not be successful. The execution of the first bootloader is not successful when the watchdog 346 is not interrupted during the predetermined time period. For example, the management device may hang or encounter an error. As such, the watchdog 346 resets the management device. After reset, the control component 314 determines whether the number of re-execution is less than the predetermined number. When the number of re-initiation is less than the predetermined number, the initiation component 306 re-executes the first bootloader from the first image.

When the number of re-initiation is not less than the predetermined number, the code acquisition component 308 locates a second image from the secondary storage device 344. The code acquisition component 308 optionally replaces the first image at the primary storage device with the second image. The initiation component 306 initiates the execution of a second bootloader from the second image. The management device may continue to run the second bootloader. In certain configurations, the secondary storage device is dedicated for storing the second image. In certain configurations, the secondary storage device is a PROM. In certain configurations, the secondary storage device is a SPI storage device. In certain configurations, the primary storage device is a SPI storage device.

Figure 4:
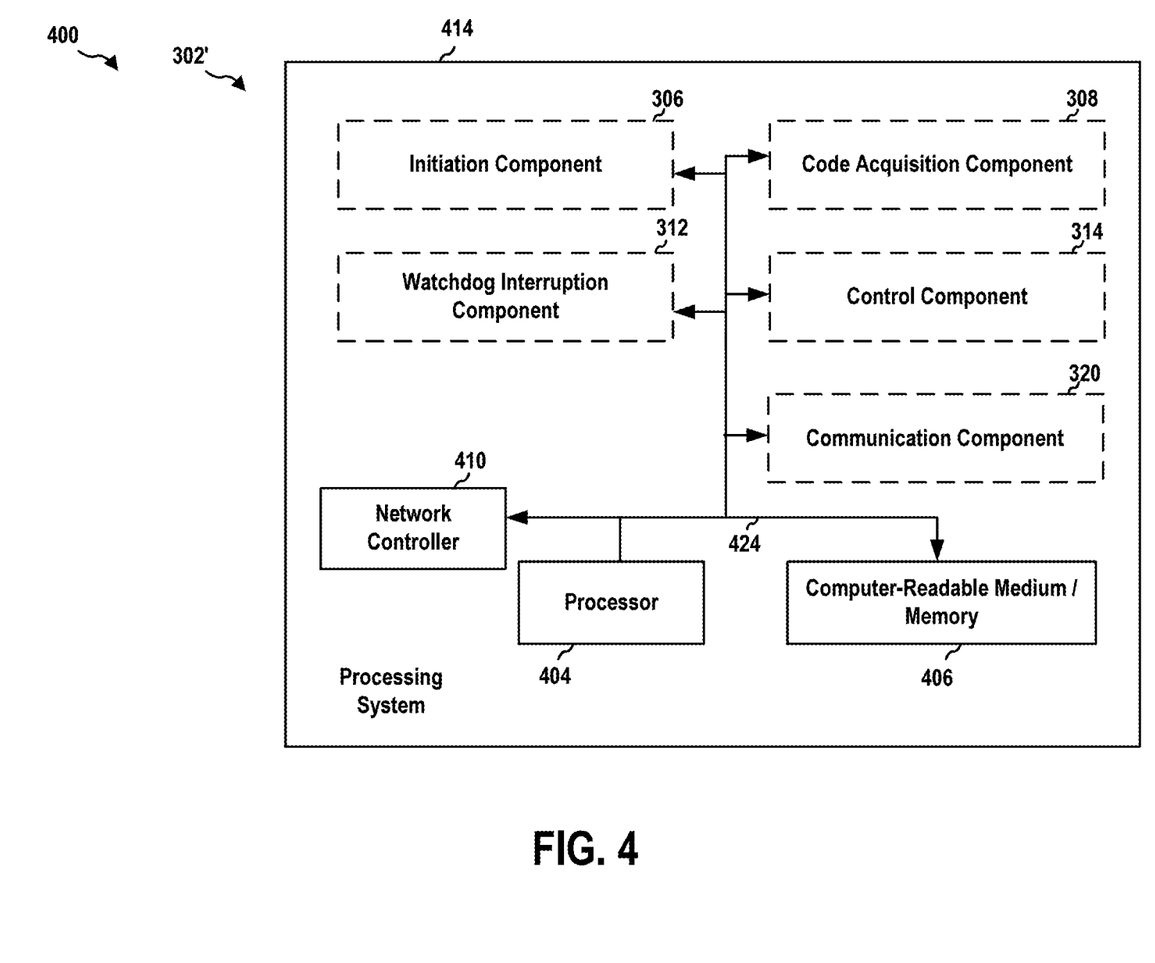
FIG. 4 is a diagram illustrating an example of a hardware implementation for an apparatus employing a processing system.

FIG. 4 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the components 306, 308, 312, 314, 320, and the computer-readable medium/memory 406. In particular, the computer-readable medium/memory 406 may include the primary storage device 342 and the secondary storage device 344. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically the communication component 320. In addition, the network controller 410 receives information from the processing system 414, specifically the communication component 320, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the components 306, 308, 312, 314, 320. The components may be software components running in the processor 404, resident/stored in the computer readable medium/memory 406, one or more hardware components coupled to the processor 404, or some combination thereof.

The apparatus 302/302' may be configured to include means for performing each of the operations described supra referring to FIG. 2. The aforementioned means may be one or more of the aforementioned components of the apparatus 302 and/or the processing system 414 of the apparatus 302' configured to perform the functions recited by the aforementioned means.

Figure 5:
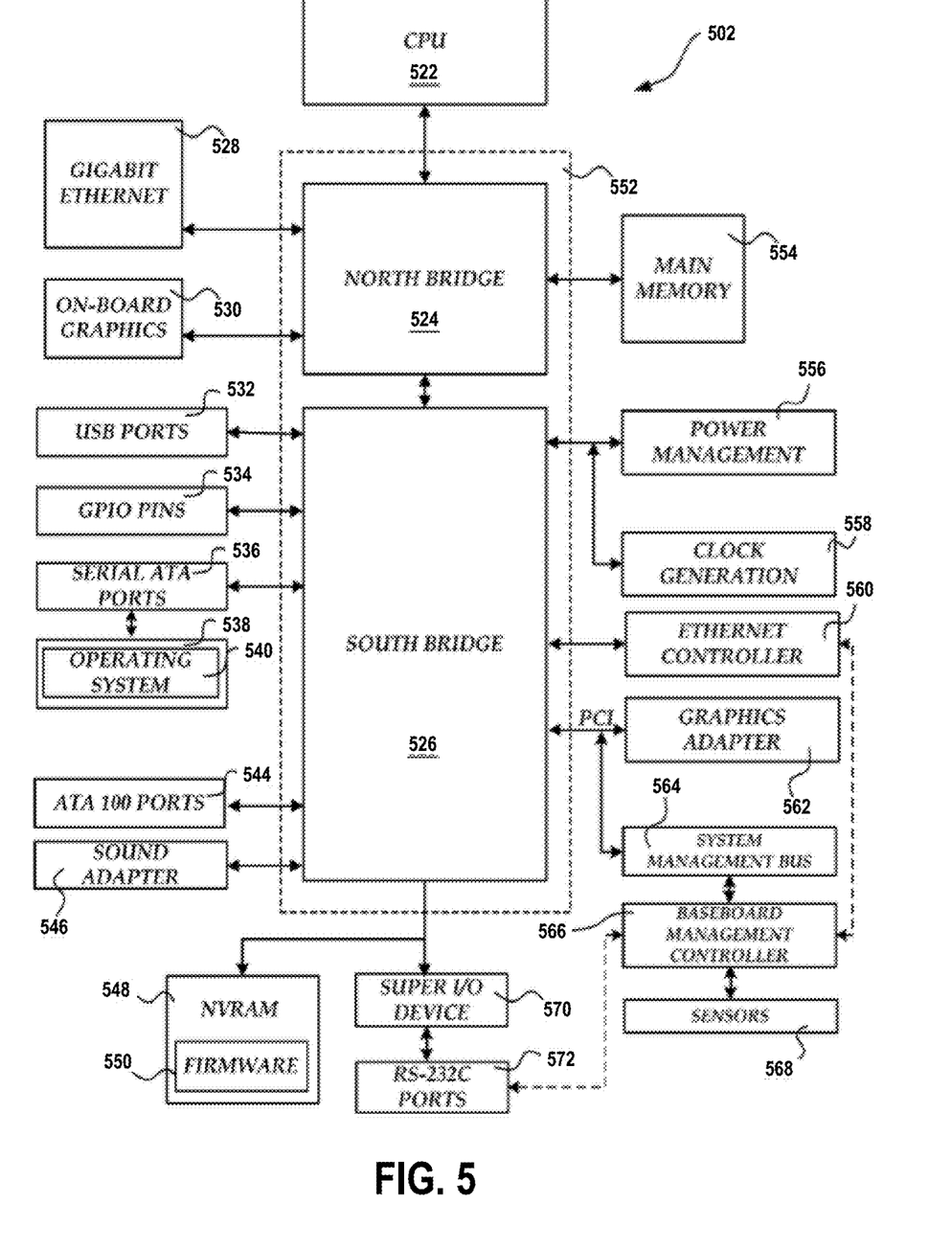
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 110, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 120. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including hand-held computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
executing, at the BMC, a first loader from a first image stored in a primary storage device of the BMC, the first loader being configured to load an operating system (OS) of the BMC from an OS image stored in the primary storage device;

re-executing, at the BMC, the first loader from the first image, when the executing is not successful and a number of re-execution is less than a predetermined number;

when the execution of the first loader is not successful and the number of re-execution is greater than or equal to the predetermined number:
(a) locating a second image from a secondary storage device; and
(b) replacing, by the first loader from the first image at the BMC, the first image stored in the primary storage device with the second image;
(c) executing, at the BMC, a second loader from the second image subsequent to the locating the second image;
(d) replacing, by the second loader from the second image at the BMC, the second image and the OS image stored in the primary device with a third image;
(e) resetting the BMC; and
(f) executing, at the BMC, a third loader from the third image stored in the primary storage device of the BMC.

2. The method of claim 1, further comprising:
initiating a watchdog subsequent to the execution of the first loader, the watchdog configured to wait, unless interrupted, a predetermined time period subsequent to the execution of the first loader and then trigger a reset of the BMC, wherein the execution of the first loader is not successful when the watchdog is not interrupted during the predetermined time period.

3. The method of claim 2, further comprising:
determining, after the reset and prior to the re-executing or the locating, whether the number of re-execution is less than the predetermined number when the execution of the first loader is not successful.

4. The method of claim 2, further comprising:
interrupting the watchdog when the execution of the first loader is successful.

5. The method of claim 1, wherein the secondary storage device is dedicated for storing the second image.

6. The method of claim 1, wherein the secondary storage device is a programmable read-only memory (PROM).

7. The method of claim 1, wherein the secondary storage device is a serial peripheral interface (SPI) storage device.

8. The method of claim 1, wherein the primary storage device is a serial peripheral interface (SPI) storage device.

9. The method of claim 1, wherein the execution of the second loader is from the second image at the secondary storage device.

10. An apparatus, the apparatus being a baseboard management controller (BMC), comprising:
a memory; and
at least one processor coupled to the memory and configured to:
execute, at the BMC, a first loader from a first image stored in a primary storage device of the BMC, the first loader being configured to load an operating system (OS) of the BMC from an OS image stored in the primary storage device;
re-execute, at the BMC, the first loader from the first image, when the executing is not successful and a number of re-execution is less than a predetermined number;
when the execution of the first loader is not successful and the number of re-execution is greater than or equal to the predetermined number:
(a) locate a second image from a secondary storage device when the execution of the first loader is not successful and the number of re-execution is greater than or equal to the predetermined number; and
(b) replace, by the first loader from the first image at the BMC, the first image stored in the primary storage device with the second image;
(c) execute, at the BMC, a second loader from the second image subsequent to the locating the second image;
(d) replace, by the second loader from the second image at the BMC, the second image and the OS image stored in the primary device with a third image;
(e) reset the BMC; and
(f) execute, at the BMC, a third loader from the third image stored in the primary storage device of the BMC.

11. The apparatus of claim 10, wherein the at least one processor is further configured to:
initiate a watchdog subsequent to the execution of the first loader, the watchdog configured to wait, unless interrupted, a predetermined time period subsequent to the execution of the first loader and then trigger a reset of the BMC, wherein the execution of the first loader is not successful when the watchdog is not interrupted during the predetermined time period.

12. The apparatus of claim 11, wherein the at least one processor is further configured to:
determine, after the reset and prior to the re-executing or the locating, whether the number of re-execution is less than the predetermined number when the execution of the first loader is not successful.

13. The apparatus of claim 11, wherein the at least one processor is further configured to:
interrupt the watchdog when the execution of the first loader is successful.

14. The apparatus of claim 10, wherein the secondary storage device is dedicated for storing the second image.

15. A non-transitory computer-readable medium storing computer executable code for operating a baseboard management controller (BMC), comprising code to:
execute, at the BMC, a first loader from a first image stored in a primary storage device of the BMC, the first loader being configured to load an operating system (OS) of the BMC from an OS image stored in the primary storage device;
re-execute, at the BMC, the first loader from the first image, when the executing is not successful and a number of re-execution is less than a predetermined number;
when the execution of the first loader is not successful and the number of re-execution is greater than or equal to the predetermined number:
(a) locate a second image from a secondary storage device; and
(b) replace, by the first loader from the first image at the BMC, the first image stored in the primary storage device with the second image;
(c) execute, at the BMC, a second loader from the second image subsequent to the locating the second image;
(d) replace, by the second loader from the second image at the BMC, the second image and the OS image stored in the primary device with a third image;
(e) reset the BMC; and
(f) execute, at the BMC, a third loader from the third image stored in the primary storage device of the BMC.

16. The non-transitory computer-readable medium of claim 15, wherein the code is further configured to:
initiate a watchdog subsequent to the execution of the first loader, the watchdog configured to wait, unless interrupted, a predetermined time period subsequent to the execution of the first loader and then trigger a reset of the BMC, wherein the execution of the first loader is not successful when the watchdog is not interrupted during the predetermined time period.

17. The non-transitory computer-readable medium of claim 16, wherein the code is further configured to:
determine, after the reset and prior to the re-executing or the locating, whether the number of re-execution is less than the predetermined number when the execution of the first loader is not successful.

18. The non-transitory computer-readable medium of claim 16, wherein the code is further configured to:
interrupt the watchdog when the execution of the first loader is successful.

19. The non-transitory computer-readable medium of claim 15, wherein the secondary storage device is dedicated for storing the second image.

\* \* \* \* \*